United States Patent
Wendt et al.

(10) Patent No.: US 10,148,088 B2
(45) Date of Patent: Dec. 4, 2018

(54) POWER DISTRIBUTION SYSTEM

(71) Applicant: PHILIPS LIGHTING HOLDING B.V., Eindhoven (NL)

(72) Inventors: Matthias Wendt, Eindhoven (NL); Eberhard Waffenschmidt, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 154 days.

(21) Appl. No.: 15/501,882

(22) PCT Filed: Jul. 22, 2015

(86) PCT No.: PCT/EP2015/066691
§ 371 (c)(1),
(2) Date: Feb. 6, 2017

(87) PCT Pub. No.: WO2016/020192
PCT Pub. Date: Feb. 11, 2016

(65) Prior Publication Data
US 2017/0222436 A1 Aug. 3, 2017

(30) Foreign Application Priority Data
Aug. 6, 2014 (EP) .................................. 14179981

(51) Int. Cl.
*H02J 1/12* (2006.01)
*H02J 1/14* (2006.01)
*H02J 1/08* (2006.01)

(52) U.S. Cl.
CPC .................. *H02J 1/14* (2013.01); *H02J 1/08* (2013.01); *H02J 1/12* (2013.01)

(58) Field of Classification Search
None
See application file for complete search history.

(56) References Cited

U.S. PATENT DOCUMENTS

| 2005/0121978 A1 | 6/2005 | McAvoy |
| 2006/0087800 A1 | 4/2006 | Savage |
| 2007/0029879 A1 | 2/2007 | Eldredge |

(Continued)

FOREIGN PATENT DOCUMENTS

| EP | 2393180 A2 | 12/2011 |
| EP | 2442425 A1 | 4/2012 |

(Continued)

*Primary Examiner* — Jared Fureman
*Assistant Examiner* — Aqeel Bukhari (57) ABSTRACT

The invention relates to a power distribution system for distributing power from a power supply (2) to several electrical loads (4, 5) via sockets (3). The sockets receive power requests from the electrical loads and transmit the power requests to a master device (9) which controls the power to be provided by the respective socket based on the received power requests. Since the master device receives all power requests from the sockets and has therefore an overview of the overall power requirements, the master device can determine the power to be provided by the respective socket under consideration of this knowledge. This can lead to an improved determination of the power to be provided by the respective socket and hence to an improved overall power distribution.

14 Claims, 6 Drawing Sheets

(56) References Cited

U.S. PATENT DOCUMENTS

| | | | |
|---|---|---|---|
| 2010/0028738 A1* | 2/2010 | Kajiwata | H01M 8/04179 |
| | | | 429/444 |
| 2010/0096925 A1 | 4/2010 | Lee et al. | |
| 2011/0080102 A1 | 4/2011 | Ge et al. | |
| 2012/0119577 A1 | 5/2012 | Clarke | |
| 2012/0303173 A1 | 11/2012 | Covaro et al. | |
| 2015/0015075 A1* | 1/2015 | Toya | H02J 9/06 |
| | | | 307/66 |

FOREIGN PATENT DOCUMENTS

| | | |
|---|---|---|
| EP | 2624375 A1 | 8/2013 |
| JP | 2009146827 A | 7/2009 |
| WO | WO2003048911 A2 | 6/2003 |
| WO | WO2008066687 A2 | 6/2008 |
| WO | WO2013038339 A1 | 3/2013 |
| WO | WO2013128354 A1 | 9/2013 |
| WO | WO2014027277 A2 | 2/2014 |

* cited by examiner

POWER DISTRIBUTION SYSTEM

CROSS-REFERENCE TO PRIOR APPLICATIONS

This application is the U.S. National Phase application under 35 U.S.C. § 371 of International Application No. PCT/EP2015/066691, filed on Jul. 22, 2015, which claims the benefit of European Patent Application No. 14179981.7, filed on Aug. 6, 2014. These applications are hereby incorporated by reference herein.

FIELD OF THE INVENTION

The invention relates to a power distribution system and method for supplying power from a power supply to several electrical loads. The invention relates further to a computer program for controlling the power distribution system.

BACKGROUND OF THE INVENTION

US 2007/0029879 A1 discloses a direct current (DC) power distribution system comprising an alternating current (AC)/DC converter for converting AC power to a DC input voltage and several DC power converters for converting the DC input voltage to a respective DC output voltage to be provided to a respective DC powered electronic device. The system further comprises a controller for controlling the DC power converters and hence the respective DC output voltage to be provided to the respective DC powered electronic device.

SUMMARY OF THE INVENTION

It is an object of the present invention to provide an improved power distribution system, method and computer program for supplying power from a power supply to several electrical loads.

In a first aspect of the present invention a power distribution system for distributing power from a power supply to several electrical loads is presented, wherein the power distribution system comprises:
  a power supply for supplying power to several sockets,
  the several sockets for supplying converted DC power to the electrical loads, wherein each socket is adapted to receive a power request from an electrical load connected to the respective socket and wherein each socket comprises:
i) a socket communication unit for transmitting the respective power request to a master device,
ii) a DC power converter for receiving the supplied power and for converting the received power to the converted DC power to be supplied to the respective electrical load,
iii) a socket controller for controlling the DC power converter depending on a controlling signal received from the master device,
  the master device, wherein the master device comprises:
  i) a master communication unit for receiving the power requests from the sockets and for transmitting the controlling signals to the sockets,
  ii) a power capability providing unit for providing power capability information being indicative of the overall power providable by the power distribution system at the several sockets,
  iii) a socket power determination unit for determining the power to be provided by the respective socket based on the received power requests and based on the power capability information and for generating the controlling signals depending on the determined powers.

Since the master device receives all power requests from the sockets and has therefore an overview of the overall power requirements, the socket power determination unit can determine the power to be provided by the respective socket under consideration of this knowledge. This can lead to an improved determination of the power to be provided by the respective socket and hence to an improved overall power distribution.

The power supply is preferentially a DC power supply. Correspondingly, the DC power converter is preferentially a DC/DC power converter. In an embodiment the power supply is adapted to supply a voltage which is preferentially larger than 100 V. For instance, the power supply may be adapted to supply voltage of about 400 V. Using such a high voltage has the advantage of reduced power distribution losses. However, the power supply can also be an AC power supply and the DC power converter can be an AC/DC power converter.

The respective socket is preferentially adapted to receive the power request in an analog or digital way. For instance, the socket communication unit can be adapted to also communicate with a respective electrical load, which is connected to the respective socket, in order to receive a power request from the respective electrical load. The socket communication unit can be a single unit or it can comprise several communication subunits. For instance, the socket communication unit can comprise a first communication subunit for communicating with the master device and a second communication subunit for communicating with the respective electrical load connected to the respective socket.

Preferentially, the electrical loads do not comprise a DC/DC power converter and comprise a load communication unit for communicating with a respective socket communication unit, in order to send a power request to the respective socket. The electrical loads are, for example, luminaires, sensors, air conditioning units, computers, television sets, music players, printers, electrical toothbrushes, shavers, mixers, juicers or other electrical devices, especially other mobile electrical devices.

The master device comprises a power capability providing unit for providing power capability information being indicative of the overall power providable by the power distribution system at the several sockets, wherein the socket power determination unit is adapted to determine the power to be provided by the respective socket based on the power requests received from the sockets and based on the power capability information. For instance, if the respective requested power is not providable, a controlling signal may be sent to the respective socket indicating that a reduced power should be provided by the respective socket.

The socket power determination unit may be adapted to determine the powers to be provided by the sockets consecutively, wherein it may be determined that the respective socket is allowed to provide the respective requested power, as long as the overall power provided by the sockets does not exceed the overall power providable by the power distribution system, based on the received power requests and the provided power capability information. Preferentially, the power requests are considered in the sequence in which they are received by the master device. If a new power request would lead to an overall power being larger than the overall power providable by the power distribution system, a lower power may be determined for the respective socket, i.e., for instance, a power limitation request may be sent from the master device to the respective socket.

In an embodiment the socket power determination unit is adapted to determine the powers to be provided by the sockets such that, if the power requests indicate an overall power being larger than the overall power providable by the power distribution system, the powers are equally distributed among the sockets without exceeding the overall power providable by the power distribution system. Thus, the power budget may be evenly distributed among the sockets, wherein any time an electrical load is connected to a socket the power budgets may be recalculated.

Moreover, the master device may further comprise a priority providing unit for providing priority information being indicative of the priorities of the sockets, wherein the socket power determination unit may be adapted to determine the power to be provided by the respective socket based on the power requests received from the sockets, the provided power capability information and the provided priority information. In particular, the socket power determination unit may be adapted to determine the powers to be provided by the sockets such that, if the power requests indicate an overall power being larger than the overall power providable by the power distribution system, firstly the power to be provided at a socket having a priority, which is lower than the priority of another socket, is reduced in comparison to the respective requested power.

The priority providing unit may just be a storing unit in which priority information received from the electrical loads connected to the respective sockets is stored. For instance, some loads like computers or emergency lamps may indicate that they and hence the sockets to which they are connected should have a higher priority, whereas other loads like battery chargers could announce that they and thus the sockets to which the battery chargers are connected have a lower priority. If the global power budget is exceeded, the powers for loads with lower priority are preferentially reduced first.

It is preferred that the respective socket comprises a bypass channel for bypassing the DC power converter such that the power supplied to the electrical load connected to the respective socket is not converted by the DC power converter. The bypass channel can be useful for distributing the non-converted power to further sockets, which may be movable, or to electrical loads requiring the non-converted power. The DC power converter can then be switched off, thereby eliminating conversion losses.

The respective socket may be operable in a bypass mode, in which the bypass channel is used, and a non-bypass mode, in which the bypass channel is not used. Preferentially, the respective socket controller is adapted to control the respective bypass channel, i.e. the respective socket controller may be adapted to control whether the respective socket is operated in the bypass mode or in the non-bypass mode. For instance, the socket controller may be adapted to control the bypass channel based on the received power request. If the power request indicates that the respective electrical load requires the non-converted power, the respective socket controller may control the respective socket to be operated in the bypass mode. The bypass channel may comprise a mechanical switch which is actuatable by a plug of a respective electrical load, which requires the non-converted power, such that respective socket is operated in the bypass mode, if the plug is inserted into the respective socket. Moreover, in an embodiment the respective socket may comprise an external bypass connector, to which a respective electrical load is connectable, wherein the external bypass connector is connected to the bypass channel such that the power supplied at the external bypass connector is not converted by the DC power converter.

It is further preferred that the respective DC power converter is a higher DC power converter being capable of providing a higher DC power, wherein the respective socket further comprises a lower DC power converter for converting the supplied DC power to a lower DC power which might be a standby power, wherein the respective socket controller is adapted to control whether the lower DC power converter is used for converting the supplied power. In particular, the respective socket controller is adapted to control whether the lower DC power converter should be used for converting the supplied power based on the received power request. In an embodiment the respective socket comprises a power sensor for sensing the output power of the respective socket, wherein the respective socket controller is adapted to control the respective socket such that the lower DC power converter is used, if the sensed output power is lower than a predefined threshold. The lower DC power converter may be regarded as being a standby power converter for converting the supplied DC power to a standby DC power. If the higher DC power converter would be used for converting the supplied DC power to the lower DC power, conversion losses would be relatively high. In contrast, by using an additional, lower DC power converter for providing the lower DC power conversion losses can be reduced.

The respective socket may further comprise a disconnection detection unit for detecting when a respective electrical load is disconnected from a respective socket, wherein the respective socket controller is adapted to shut down the supplied power, after the disconnection detection unit has detected the disconnection. The respective socket controller is preferentially adapted to shut down the supplied power in ms. This can reduce the likelihood of sparks, which may occur when disconnecting the respective electrical load from the respective socket. The disconnection detection unit can comprise a lead pin which opens first during unplug. This pin may also be used for communication purposes, i.e. for communicating between the respective socket and the respective electrical load.

In a preferred embodiment the respective socket comprises a main switch for switching the respective socket on and off, wherein the main switch and a respective electrical load may be adapted such that the respective socket is switched on by the electrical load, if the respective electrical load is connected to the respective socket. Thus, without a connected electrical load the respective socket may be switched off, wherein it is switched on by connecting the electrical load to the respective socket. The sockets do therefore not consume power, if there is not an electrical load connected to the respective socket, thereby reducing the overall power consumption of the power distribution system. Moreover, since no power is supplied to a socket, if an electrical load is not connected to the socket, a touch protection is provided.

The main switch and the respective electrical load may be adapted such that during disconnecting the respective electrical load from the respective socket the respective socket is switched off before electrical contacts between the electrical load and the respective socket get disconnected. Also this can reduce the likelihood of sparks.

The respective socket may be adapted to be operable in an operational mode and in a safety mode, wherein the respective socket may comprise a failure detection unit for detection a failure condition and wherein the respective socket controller may be adapted to control the socket to be in the safety mode, if the failure detection unit has detected a failure condition. The failure detection unit may be adapted to detect at least one failure condition of a list consisting of an output current exceeding a predefined threshold current, an output voltage becoming zero and/or falling below a predefined threshold voltage, an output power exceeding a predefined power threshold, the output voltage being not within a predefined range and the electrical load not sending a control value to the respective socket within a predefined time. An output voltage becoming zero and/or falling below a predefined voltage threshold may indicate a wire break. Moreover, the respective socket may be adapted such that in the safety mode the respective socket is switched off or in a low-power mode, especially a standby mode, in which the respective socket provides a reduced DC power only.

In an embodiment the power distribution system further comprises a power distribution device for connecting several electrical loads to a same socket, wherein the power distribution device includes a) several connection sites to be connected with the several electrical loads, b) a DC power converter for converting the power from the socket to converted power to be supplied to the respective electrical load, and c) a power distribution device controller for controlling the DC power converter and for negotiating power requirements with the socket controller of the respective socket. Also the power distribution device may comprise a bypass channel for bypassing the DC power converter, if the respective electrical load allows this.

The DC power converters may be adapted to operate bidirectionally, in order to allow a DC power providing unit to be connected to a socket such that DC power provided by the DC power providing unit is distributable within the power distribution system. The DC power providing unit is, for instance, a photovoltaic unit. Thus, the sockets may not only be adapted to supply DC power to electrical loads, but also to receive DC power from DC power providing units connected to the sockets and to supply the provided DC power into the DC power distribution system.

In another aspect of the present invention a master device for being used within a power distribution system as defined in claim 1 is presented, wherein the master device comprises:
  a master communication unit for receiving power requests from the sockets of the power distribution system and for transmitting controlling signals to the sockets,
  a power capability providing unit for providing power capability information being indicative of the overall power providable by the power distribution system at the several sockets,
  a socket power determination unit for determining the power to be provided by the respective socket based on the received power requests and based on the power capability information and for generating the controlling signals depending on the determined powers.

In a further aspect of the present invention a power distribution method for distributing power from a power supply to several electrical loads within a power distribution system as defined by claim 1 is presented, wherein the power distribution method comprises:
  supplying power to several sockets by the power supply,
  receiving power requests from the electrical loads connected to the sockets of the power distribution system by the sockets,
  transmitting the received power requests to the master device of the power distribution system by the sockets,
  providing power capability information being indicative of the overall power providable by the power distribution system at the several sockets by a power capability providing unit of the master device,
  determining the power to be provided by the respective socket based on the received power requests and based on the power capability information and generating controlling signals for controlling the sockets depending on the determined powers by the socket power determination unit of the master device,
  transmitting the controlling signals to the sockets by the master communication unit of the master device,
  controlling the DC power converters of the sockets depending on the respective controlling signal received from the master device by the respective socket controllers.

In another aspect of the present invention a computer program for controlling a power distribution system as defined in claim 1 is presented, wherein the computer program comprises program code means for causing the power distribution system to carry out the steps of the power distribution method as defined in claim 13, when the computer program is run on a computer controlling the power distribution system.

It shall be understood that the power distribution system of claim 1, the master device of claim 12, the power distribution method of claim 13 and the computer program of claim 14 have similar and/or identical preferred embodiments, in particular, as defined in the dependent claims.

It shall be understood that a preferred embodiment of the present invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Figure 1:
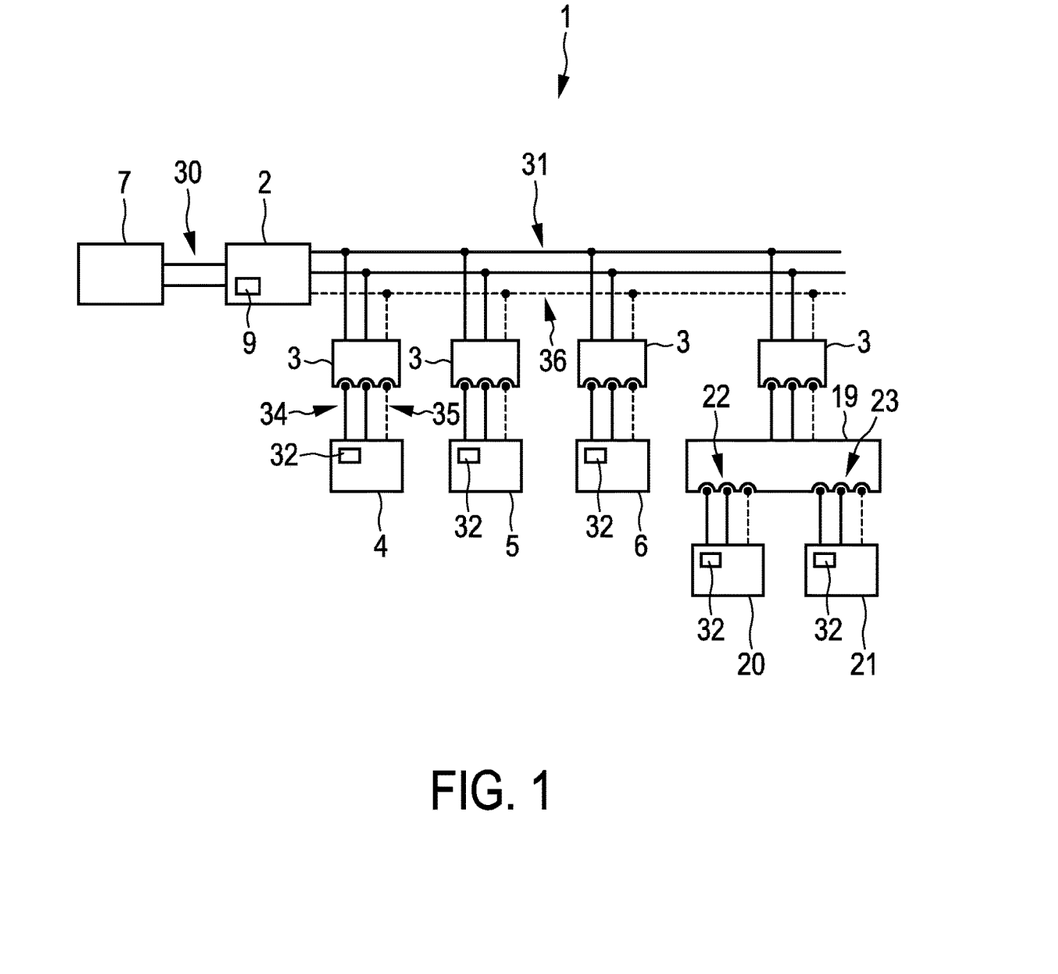
FIG. 1 shows schematically and exemplarily an embodiment of a power distribution system for distributing power from a power supply to several electrical loads.

FIG. 1 shows schematically and exemplarily an embodiment of a power distribution system for supplying power from a power supply to several electrical loads. The power distribution system 1 comprises a mains power source 7 for providing AC mains power to a power supply 2. The power supply 2 is an AC/DC power converter for converting the AC mains power to DC power to be provided to several sockets 3. The power supply 2 can therefore also be regarded as being a mains power converter. The power supply 2 receives the mains AC power, especially a corresponding AC mains voltage, via a supply rail 30, converts the received AC mains power to DC power and provides the converted DC power to sockets 3 via a supply rail 31. The power supply 2 is preferentially a switched mode power supply. The power supply 2 can comprise a known rectifier stage, wherein the rectifier stage may include a known power factor correction circuit, in order to minimize distortions of the sinusoidal current on the supply rail 30.

In another embodiment DC power may be provided to the power supply 2 such that the power supply 2 may comprise a DC/DC converter like a known step-down converter. In this case the duty cycle of a switching transistor of the step-down converter may be varied, in order to control an output voltage to a desired value. The power supply 2 may also comprise a transformer, in order to provide a galvanic insulation between the supply rail 30 and the sockets 3. For instance, in an embodiment, in which the power supply converts provided DC power to DC power having another value, the power supply may comprise a flyback converter, wherein by modifying the duty cycle of a switching transistor of the flyback converter, the output voltage of the power supply may be controlled to a desired value. The power supply can of course also comprise other converters like a known load resonant converter, wherein in this case the output voltage may be controlled by varying a switching frequency.

Figure 2:
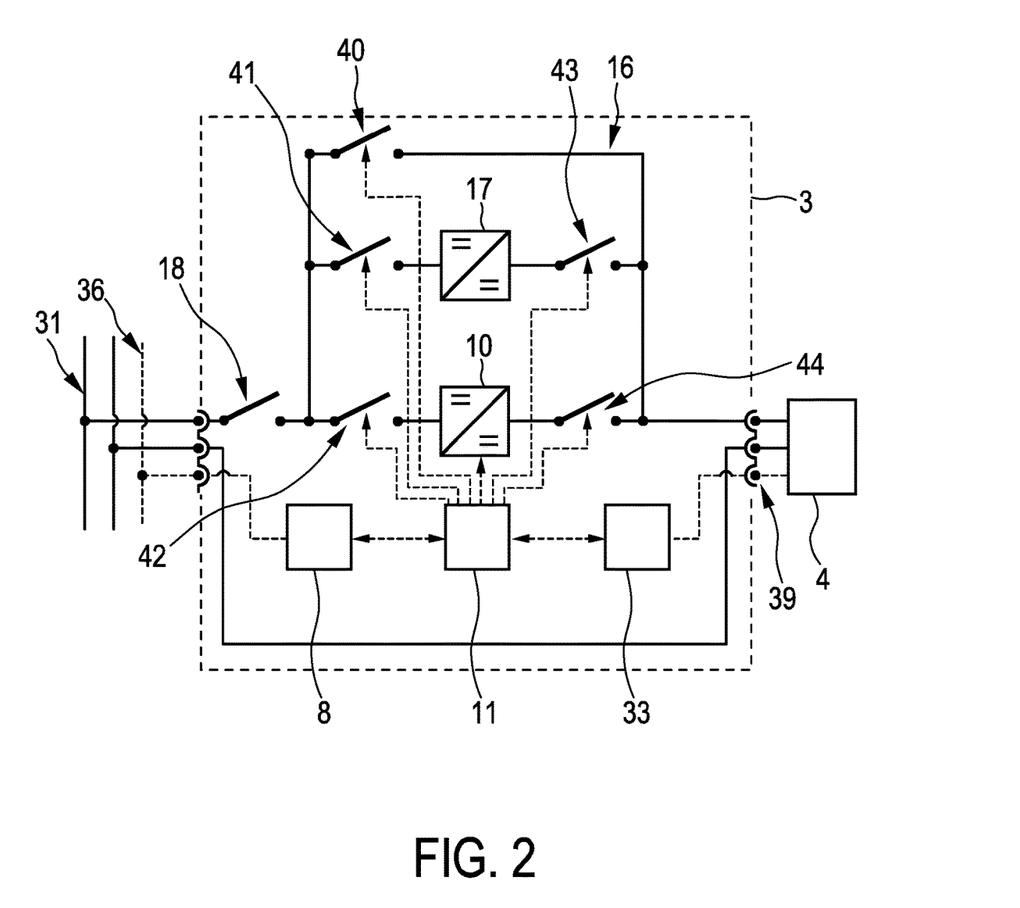
FIG. 2 shows schematically and exemplarily an embodiment of a socket of the power distribution system.

The several sockets 3 of the power distribution system 1 are adapted to supply converted DC power to electrical loads 4, 5, wherein each socket 3 is adapted to receive a power request from an electrical load 4, 5 and wherein each socket comprises, as schematically and exemplarily illustrated in FIG. 2, a socket communication unit comprising a first communication subunit 8 for transmitting a respective power request to a master device 9 and a second communication subunit 33 for communicating with the respective electrical load 4, 5. The respective socket 3 further comprises a DC power converter 10 for receiving the power supplied by the power supply 2 and for converting the received power to the converted DC power to be supplied to the respective electrical load 4, 5 and a socket controller 11 for controlling the DC power converter 10 depending on a controlling signal received from the master device 9.

Figure 3:
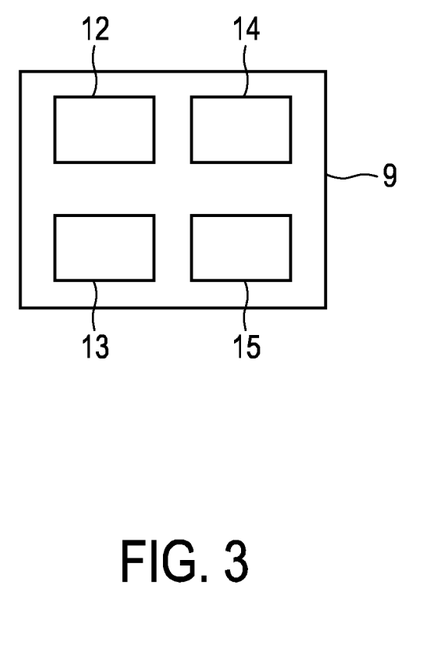
FIG. 3 shows schematically and exemplarily an embodiment of a master device of the power distribution system.

The master device 9, which is schematically and exemplarily illustrated in some more detail in FIG. 3, comprises a master communication unit 12 for receiving the power requests from the sockets 3 and for transmitting the controlling signals to the sockets 3 and a socket power determination unit 13 for determining the power to be provided by the respective socket based on the received power requests and for generating the controlling signals depending on the determined powers.

The electrical loads 4, 5 do not comprise DC/DC power converters, but they comprise communication units 32 for communicating with the respective socket 3 of the power distribution system 1, in order to send power requests. The electrical loads 4, 5 are, for example, luminaires, sensors, air conditioning units, computers, printers, et cetera. The electrical loads 4, 5 comprise of course not only respective communication units 32, but also further units like a load controller, a light source, if the respective electrical load is a luminaire, et cetera.

The second communication subunit 33, which is used for the communication with the respective load 4, 5, especially for receiving power requests, and which can be regarded as being a communication interface, is adapted to convert the physical structure of the transmitted signal to a signal suitable for the socket controller 11. The second communication subunit 33 may comprise an analog circuit or a digital circuit. It may comprise a buffer, an amplifier or an impedance matching circuit at its input. It provides a data connection from and to the respective load, wherein the communication signal may be an analog or digital signal. Also the first communication subunit 8 may comprise an analog or digital circuit, wherein the first communication subunit 8 may comprise a buffer, an amplifier or an impedance matching circuit at its input. It provides data connections from and to the master device 9 and it may optionally also provide data connections from and to other sockets 3. Also the communication signal used by the first communication subunit 8 may be an analog or digital signal.

An analog signal may be a voltage or current value, wherein the voltage or current value corresponds to the transmitted signal value. Also an impedance value on a load side may function as signal means. In addition, a frequency signal may be used as signal, wherein, for instance, the frequency of the signal may correspond to the signal value. Also a pulse-shaped signal may be used, wherein the pulse width and/or the duty cycle may be varied and wherein the pulse width and/or the duty cycle may correspond to the transmitted signal value. A digital signal preferentially comprises a series binary code transmission using known coding techniques like Manchester coding. If digital signals are used, the communicated data can contain more complex content in comparison to the content providable by using analog signals.

The sockets 3 are connected to the loads 4, 5 via power supply connections 34 and data connections 35 and the sockets 3 are connected to the power supply 2 via the supply rail 31 and a data connection 36, wherein in this embodiment the master device 9 is integrated in the power supply 2 such that the sockets 3 can communicate with the master device 9 via the data connection 36. In other embodiments the master device 9 may also be a separate device, i.e. a device which is not integrated in the power supply 2, wherein in this case the master device may directly be connected to the data connection 36.

Thus, in the embodiment shown in FIG. 1 the communication to the respective load and to the master device uses a respective separate wire 35, 36. In another embodiment the data signal may be superimposed on the distributed power by using, for instance, known power line communication techniques or by load modulation performed by the respective load. The data connection can also be a wireless electromagnetic data transmission connection using, for instance, a radio frequency identification (RFID) standard or the Bluetooth standard. The direction of the communication between the respective socket 3 and the respective load 4, 5 is at least from the respective load to the respective socket such that the respective load can give feedback, in order to adjust, for instance, an output voltage of the respective socket, especially of the respective DC power converter 10. However, the communication between the respective socket and the respective load can also be bidirectional.

The master device 9 comprises a power capability providing unit 14 for providing power capability information being indicative of the overall power providable by the power distribution system 1 at the several sockets 3, wherein the socket power determination unit 13 is adapted to determine the power to be provided by the respective socket 3 based on the power requests received from the socket 3 and based on the power capability information. For instance, if the requested overall power is larger than the providable overall power, controlling signals may be sent to the sockets 3 indicating that a reduced power should be provided.

The socket power determination unit 13 can be adapted to determine the powers to be provided by the sockets 3 consecutively, wherein it is determined that the respective socket 3 is allowed to provide the respective requested power, as long as the overall power provided by the sockets 3 does not exceed the overall power providable by the power distribution system 1, based on the received power requests and the provided power capability information. For example, the power requests can be considered in the sequence in which they are received by the master device 9. If a new power request would lead to a requested overall power being larger than the providable overall power, a lower power may be determined for the respective socket 3, i.e., for instance, a power limitation request may be sent from the master device 9 to the respective socket 3. In a further example the socket power determination unit 13 may be adapted to determine the powers to be provided by the sockets 3 such that, if the power requests indicate a requested overall power being larger than the providable overall power, the powers are equally distributed among the sockets, which have requested the powers, without exceeding the providable overall power.

The master device 9 also comprises a priority providing unit 15 for providing priority information being indicative of the priorities of the sockets, wherein the socket power determination unit 13 is adapted to allow a determination of the power to be provided by the respective socket based on the power requests received from the sockets, the provided power capability information and the provided priority information. The socket power determination unit 13 can be adapted to determine the powers to be provided by the sockets, which have requested power, such that, if the power requests indicate a requested overall power being larger than the providable overall power, firstly the power to be provided at a socket having a priority, which is lower than the priority of another socket, is reduced.

In this embodiment the priority providing unit 15 is a storing unit in which priority information received from the electrical loads connected to the sockets are stored. For instance, some loads like computers or emergency lamps may indicate that they and hence the sockets to which they are connected should have a higher priority, whereas other loads like battery chargers could announce that they and thus the sockets to which they are connected have a lower priority. If the global power budget is exceeded, the powers for loads with lower priority are preferentially reduced first.

Thus, if an electrical load is connected to a socket, the socket announces the power demand to the master device. The master device has information about the power capability of the overall power distribution system including information about cables, plugs and other interconnections and calculates whether this power demand is possible under consideration of the power demands of the other sockets. This is a smart way to not overload the power distribution system components. If the full power transmission is not available, the master device may communicate to the sockets to reduce or limit the power consumption. The master device may decide with a first-come-first-serve algorithm, i.e. the master device may allow the requested power budget of all connected sockets one after the other, wherein the first device, which exceeds the global power limit, gets a limitation request from the master device. Or, the available power budget may be distributed evenly among the connected sockets, wherein any time a new electrical device is connected to a socket, the power budget may be recalculated. Furthermore, the connected electrical loads may announce a priority for power supply, especially during an initialization phase which will be described further below, wherein electrical loads having a higher priority like computers or emergency lamps may be constantly powered, whereas electrical loads having a lower priority like battery chargers may receive a reduced power first, if the global power budget is exceeded.

The master device 9 can provide a user interface for allowing a user to input a request for reduced power consumption. For instance, a grid operator can input a demand for reduced power consumption, in order to reduce the load of the mains grid. The user may request a lower power consumption because of, for instance, higher actual energy prices. Also an operator using the electrical loads for energy trading may input a demand for reducing the power consumption of the electrical loads. Thus, the power distribution system 1 can be adapted to allow for a demand side control.

The respective socket 3 further comprises a bypass channel 16 for bypassing the DC power converter 10 such that the power supplied to the respective electrical load 4, 5 connected to the respective socket 3 is not converted by the DC power converter 10. The bypass channel 16 can be useful for distributing the power received from the supply rail 31 directly to further sockets which may be connected to the respective socket 3 that is directly connected to the power rail 31. If the bypass channel 16 is used, at least the DC power converter 10 may be switched off.

The respective socket 3 is operable in a bypass mode, in which the bypass channel 16 is used, and a non-bypass mode, in which the bypass channel is not used. These modes are controlled by the socket controller 11 based on the respective received power request such that, if the received power request indicates that the respective electrical load requires the DC power received from the supply rail 31 and if the master device 9 does not indicate that less DC power should be provided by the respective socket 3, the respective socket 3 is operated in the bypass mode. In another embodiment the respective socket may also comprise an external bypass connector, to which a respective electrical load is connectable, wherein the external bypass connector is connected to the bypass channel such that the power supplied at the external bypass connector is not converted by the DC power converter 10 or a further DC power converter 17, i.e. at the bypass connector the power from the supply rail 31 is directly provided.

Thus, the sockets 3 comprise a respective bypass channel, in order to pass the voltage of the supply rail 31 directly to an output of the respective socket 3. This can be used for electrical loads which can operate with this power, especially with this voltage. In addition, this can be used for further distributing the power to further movable sockets or to distribute the power to several loads. If the bypass channel is used, the power converters can be switched off such that no conversion losses may appear.

In the embodiment schematically and exemplarily shown in FIG. 2 the bypass channel 16 is activated by closing a bypass switch 40, if a main switch 18 is closed. In order to not damage the output of the DC power converter 10 and also of the further DC power converter 17, each power converter output is connected to the outputs of the respective load 3 via a respective switch 43, 44. The socket controller 11 is preferentially adapted to open these switches 43, 44 and optionally also further switches 41, 42, if the bypass channel 16 is activated. Thus, the socket controller 11 can be adapted to take care that in the bypass mode the main switch 18 and the bypass switch 40 are closed, switches 43, 44 and optionally also switches 41, 42 are open and the DC power converters 10, 17 are switched off.

The activation of the bypass channel 16 may be requested by the respective electrical load using the communication channel between the respective electrical load and the respective socket. However, in another embodiment the bypass channel may also be mechanically activated by a mechanical means in the respective socket. The mechanical means may be activated by a special form of a plug of the respective electrical load inserted into the respective socket. Thus, electrical devices, which allow for a bypassing of the power, can have this special form or shape of the plug in this example. Other devices, which require the controlled output power, especially the controlled output voltage, may not have this plug with the special form or shape. This mechanical solution may not require an involvement of the socket controller, because the mechanical solution may be configured such that the power converters of the respective socket are switched off in the case of power-bypass. In order to provide this mechanical solution, the respective socket can comprise a toggle switch toggling the socket output between the output of the converters of the socket and the bypass channel. In a further example the bypass channel is passed to an additional pin, i.e. to an external bypass connector, wherein in this case an additional switch for activating and deactivating the bypass channel may not be required. Electrical loads, which want to make use of the bypass feature of the respective socket, may simply be connected to this pin.

The DC power converter 10 is a higher DC power converter being capable of providing a higher DC power and the further DC power converter 17 is a lower DC power converter for converting the supplied DC power to a lower DC power. The respective socket controller 11 is adapted to control whether the lower DC power converter 17, the higher DC power converter 10 or the bypass channel 16 is used by actuating the respective switches 40 . . . 44 and/or by switching the power converters 10, 17 on and off. In particular, if a respective electrical load is switched off, it may require only a very low power. In this case the higher DC converter 10, which may also be regarded as being a main power converter, would operate very inefficiently and would generate more power losses than power delivered to the respective electrical load. In order to reduce these losses, the respective socket 3 comprises the lower DC power converter 17. If the respective electrical load is switched off, the higher DC power converter 10 may be switched off and the lower DC power converter 17 may be switched on. In this situation the lower DC power converter 17 also provides the supply voltage for the socket controller 11 and for the communication subunits 8, 33. The lower DC power converter 17 may be activated by a signal or command given by the respective electrical load, whereupon the socket controller 11 may switch off the higher DC power converter 10 and switch on the lower DC power converter 17. The lower DC power converter 17 is preferentially adapted to provide a standby power as the lower DC power such that the lower DC power converter 17 can also be regarded as being a standby power converter.

In another embodiment the respective socket can comprise sensors for measuring the output voltage, wherein the socket controller can be adapted to activate the low DC power function, especially to provide the standby power, if the output power falls below a predefined threshold level. The sensors for measuring the output power can be known current and voltage sensors. The socket can also comprise sensors for sensing the input power, i.e. the power received from the supply rail 31. Also the sensors for measuring the input power can be known current and voltage sensors. For instance, the socket can be adapted to operate only, if the sensed input voltage is within a predefined voltage range. In particular, the socket controller 11 can be adapted to control the main switch 18 such that it is closed, i.e. conducting, only if the sensed input voltage is within the predefined input voltage range. Thus, if the input voltage is below a minimum input voltage due to, for instance, an overload condition, the respective socket may be switched off, in order to provide a brownout protection. The input power monitoring can also guarantee that the input power of the respective socket never exceeds a maximally allowed power.

The main switch 18 of the respective socket 3 is preferentially adapted such that, if the main switch 18 is open, i.e. not conducting, the power converters 10, 17 are not supplied with power from the supply rail 31 and thus do not consume any power. It is further preferred that, if the main switch 18 is open, the respective socket 3 does not consume any power, i.e. that also the communication units 8, 33 and the socket controller 11 do not consume any power. The main switch 18 may be a mechanical switch which is mechanically operated by a plug of the respective electrical load. If the plug is plugged into the respective socket 3, a mechanical means may close the main switch 18. In this way a non-used socket 3, i.e. a socket not being connected to any device, does not consume power. In a further embodiment the respective socket may comprise an additional pin, wherein the supply rail voltage may be connected to this pin with a high ohmic resistance. Moreover, the plug of the respective electrical load may provide a connection to a ground potential, if plugged in the respective socket. Thus, if the plug is plugged into the respective socket, current flows, which can be used to switch a relay switch or to operate a semiconductor switch as a main switch of the respective socket, in order to switch on the respective socket. In a further embodiment this signal, i.e. the current flow, can be passed to the electrical load, wherein the electrical load can be adapted to use this current flow for remotely controlling the respective socket. Thus, in an embodiment a switch in a respective electrical load can be used for switching the respective socket on or off. For instance, the respective electrical load can comprise a manual switch, which can switch the current flow used for switching a relay switch or for operating a semiconductor switch of the respective socket, in order to remotely control the respective socket.

In a further embodiment an electrical load comprises a small energy storage like a capacitor which, when loaded, supplies, for instance, a remote control receiver. If the charge in the energy storage goes down below a predefined lower level, the electrical load can send a power request to the respective socket, in order to receive power for recharging the energy storage of the electrical load. After the energy storage has been charged above a predefined upper level, the electrical load can send a request to the respective socket, which indicates that the power supply can be stopped. If the energy storage does not need to be charged, because it is above the lower predefined level, the respective socket can be completely switched off. Thus, for instance, sufficient power for a standby functionality of the electrical load can be provided by the energy storage, without requiring the respective socket to supply any power, i.e. the respective socket only needs to supply power for recharging the energy storage, when the charge in the energy storage goes below the predefined lower level. For example, the respective socket may be active for one minute only in twenty-four hours, in order to keep the standby functionality of the electrical load.

The switches 40 . . . 44 are preferentially semiconductor switches like MOSFET (metal-oxide-semiconductor field-effect transistor) switches. Also the main switch may be semiconductor switch. However, the main switch 18 may also be a mechanical switch as described above. Also the other switches may at least partly be mechanical switches. The two switches 43, 44 at the outputs of the DC power converters 10, 17 can also be realized by diodes. In this case they do not need to be controlled by the socket controller 11. In some types of known DC converters such diodes are already present at the output stage of the DC converters such that additional diodes or switches 43, 44 may not be needed. On the primary side of the DC power converters 10, 17 the switches 41, 42 may be omitted, especially if the operation of the DC converters 10, 17 can be shut down in a different way, for instance, by using switches within the DC power converters 10, 17, in order to switch them completely off.

The socket controller 11 may be an analog or digital circuit. It is preferentially adapted to set a value for the output voltage of the DC power converter 10 depending on settings provided by the communication interface, i.e. depending on information received via the communication subunits 8, 33. The socket controller 11 may comprise an algorithm for converting a communicated signal from the respective electrical load to a required input signal for the respective DC power converter, which is related to the output voltage of the respective socket. As an analog circuit, the socket controller 11 may provide a voltage that is proportional to the requested output voltage of the DC power converter 10. Then, the respective DC power converter 10 converts this control voltage into, for instance, a suitable duty cycle or frequency depending on the type of power converter. As a digital circuit, the socket controller 11 may also provide an analog voltage using a digital-to-analog converter. However, the socket controller 11 may also directly deliver a switching signal to one or several switches of the DC power converter 10.

The DC power converter 10 is adapted to operate bidirectionally, in order to allow a DC power providing unit 6 to be connected to a respective socket 3 such that DC power provided by the DC power providing unit 6 is distributable within the power distribution system 1. The DC power providing unit 6 is, for instance, a photovoltaic unit. In order to allow for the bidirectionality, the DC power converter is, for instance, a step down/step up converter or a bidirectional flyback converter providing a galvanic insulation.

The communication between the respective electrical load 4, 5 and the respective socket 3 preferentially comprises two phases, an initialization phase and an operating phase. The main purpose of the initialization phase is the determination of an initial output voltage required by the respective electrical load 4, 5. Moreover, optionally further information can be exchanged between the respective socket 3 and the respective electrical load 4, 5 during the initialization phase like an authorization of the respective electrical load, a power demand of the respective electrical load, i.e., for instance, a maximal power level, a minimal power level or a typical power level, and a voltage range of the respective electrical load.

In an embodiment, if the respective electrical load is connected to the respective socket, the socket first provides a low standby voltage, which may be provided by the lower DC power converter 17. This standby voltage is sufficient for the respective electrical load 4, 5 to communicate during the initialization phase. During this phase one or more values are transmitted from the electrical load 4, 5 to the socket 3. The meaning of the values may be distinguished by the respective socket 3 depending on the order in which the values are transmitted, or the socket 3 may send a request for a certain value, wherein the socket 3 then knows that the received value is the requested one.

The respective electrical load 4, 5 may send one value which corresponds to the required voltage, for instance, which is proportional to the required voltage. Upon receiving this value the respective socket 3 may switch on the higher DC power converter 10 and control the output voltage to the required voltage, if not overruled by the master device 9. That means a power request, which corresponds to the required voltage, is transmitted to the master device 9, wherein the socket power determination unit 13 determines whether the required voltage is providable. If this is not the case, the master device 9 sends a controlling signal to the socket 3 indicating that the socket 3 should provide a smaller voltage or no voltage at all. If the voltage is providable, a corresponding controlling signal may be sent from the master device 9 to the socket 3, or the socket 3 may wait for a certain time and deduce that the voltage is providable, if a controlling signal from the master device 9 has not been received, after the certain time has elapsed.

Informing the respective socket 3 about the required output voltage by sending a value, which is, for instance, proportional to the required voltage, is especially advantageous for analog signal transmission. However, this technique can also be used with a digital signal transmission.

The respective electrical load can in addition transmit a series of values which correspond to an identification code for identifying the respective electrical load. The respective socket may be adapted to identify whether the identification code represented by the series of values is valid or not by, for instance, comparing the identification code with a list of identification codes, which may be stored in the respective socket, or by other known decryption methods. The respective socket may be adapted such that the required output voltage is applied only, if the identification code corresponds to a valid electrical load. The valid electrical loads may be approved by an authority in advance. This procedure has the advantage that non-valid devices can be excluded from operation, in order to keep the power distribution system safe.

The respective electrical load may be adapted to transmit in addition further values to the respective socket, wherein these further values may correspond to, for instance, its power demand, i.e. the maximum power which the respective electrical load is supposed to request.

If the respective electrical load takes more power than indicated, a failure may be detected and the respective socket or the entire power distribution system may go into a safety mode, which may also be regarded as being a safe operating mode. This failure detection can be performed by the respective socket controller such that the respective socket controller may be regarded as being a failure detection unit for detecting a failure condition. The respective electrical load can also be adapted to transmit further values to the respective socket, which correspond to a voltage range of the electrical load, wherein the respective socket can be adapted to detect, when the voltage gets out of the communicated voltage range, in order to detect a failure. Also this failure detection procedure can be performed by the controller. If such a failure is detected, the respective socket or the entire power distribution system may go into the safety mode. The respective socket may also be adapted to vary the output voltage in a certain range and thus to have influence on the power transmission. This can be used for an active power control on the supply side of the respective socket.

During the operating phase power is transferred to the respective electrical load and the output voltage is regulated, wherein the output voltage is determined by the master device 9 and the respective socket 3. The output voltage may not be a constant value during operation. It may change according to the needs of the respective electrical load. For instance, if the respective electrical load is a battery charger, the output voltage may be controlled depending on the charging profile. Since the output voltage is controlled by the master device 9 and the respective socket 3, the electrical load, i.e. in this example the battery charger, does not necessarily need an additional DC power converter. This avoids additional conversion stages, saves material and reduces losses. The respective electrical load may transmit a value being proportional to the desired output voltage, wherein then the respective socket 3 controls the output voltage to the desired voltage value, if the respective socket 3 is not overruled by the master device 9. For instance, if the master device 9 indicates that due to the available overall power budget a smaller output voltage should be provided, the respective socket 3 provides this lower output voltage to the respective electrical load.

The respective electrical load may be adapted to transmit a value, which corresponds to a voltage difference related to an actual applied voltage. As long as the transmitted value is zero, the output voltage is kept constant by the respective socket 3. A positive value may lead to an increase of the output voltage and a negative value may lead to a decrease of the output voltage. The larger the value the larger the voltage change is. This kind of communication between the respective electrical load and the respective socket has the advantage that it may be independent of the actual voltage level and is thus easier to be applied to future versions. Such a control principle is applied, for instance, in the Qi standard for wireless charging of mobile devices issued by the wireless power consortium. For more details regarding this voltage difference based communication reference is made to this standard. Moreover, in the operating phase a value may be transmitted constantly, in regular time intervals or only, when a change of the output voltage is necessary, from the respective electrical load to the respective socket. The respective socket and the master device may be adapted to try to provide the output voltage, which corresponds to the last value received from the respective electrical load, until a next value is received from the respective electrical load.

Although in an above described embodiment the failure detection functionality is integrated in the respective socket controller, in other embodiments the failure detection unit can also be a separate unit within the respective socket, wherein the respective socket controller can be adapted to control the respective socket such that it is operated in the safety mode, if the failure detection unit has detected a failure condition. The failure condition may be detected, if the output current exceeds a threshold value, the output voltage becomes zero or falls below a threshold voltage, the output power exceeds a threshold value, the output voltage is not within a specified voltage range or the respective electrical load does not send a value to the respective socket within a predefined time. The respective socket may comprise an indicator lamp for indicating that a failure condition has been detected to a user. The respective socket controller may be adapted to switch off the main switch 18, if a failure has been detected, in order to operate the respective socket in its safety mode. The respective socket may be adapted such that it goes from the safety mode to the operational mode, only if the plug of the respective electrical load has been removed from the respective socket, i.e. the operational mode may be reset only when unplugging the respective electrical load from the respective socket. In a further example the safety mode may firstly correspond to a standby mode, particular to a mode in which only the lower DC power converter 17 provides DC power. Furthermore, the respective socket may then go into an initialization mode for performing the above described initialization. If it is not possible to maintain the standby mode, for instance, due to a short circuit, the respective socket switches off the main switch 18.

If a DC power providing unit 6 is connected to a respective socket 3, i.e. if a local generator like a photovoltaic panel or a battery is connected to the respective socket 3, a respective power providing mode of operation may be announced by the respective DC power providing unit 6 to the respective socket 3 during the initialization phase. Thus, the power distribution system is adapted to allow for a bidirectional power flow, wherein whether the respective electrical device consumes power or provides power can be announced by the respective electrical device during the initialization phase. The power distribution system 1 further comprises a power distribution device 19 for connecting several electrical loads 20, 21 to a same respective socket 3. The power distribution device 19 is schematically and exemplarily shown in more detail in FIG. 4. It includes several connection sites 22, 23 to be connected with the several electrical loads 20, 21, DC power converters 24, 25 for converting the power from the respective socket 3 to converted power to be supplied to the respective electrical load 20, 21 and a power distribution device controller 26 for controlling the DC power converters 24, 25 and for negotiating power requirements with the socket controller 11 of the respective socket 3. The power distribution device 19 further comprises a distribution device communication unit comprising a first communication subunit 50 for at least receiving power requests from the electrical loads 20, 21 and a second communication subunit 51 for communicating with the socket controller 11 of the respective socket 3 for performing the power negotiations. Also the communication subunits 50, 51 are controlled by the power distribution device controller 26. Moreover, the power distribution device 19 comprises switches 60 . . . 64, which are also controlled by the power distribution device controller 26.

Figure 4:
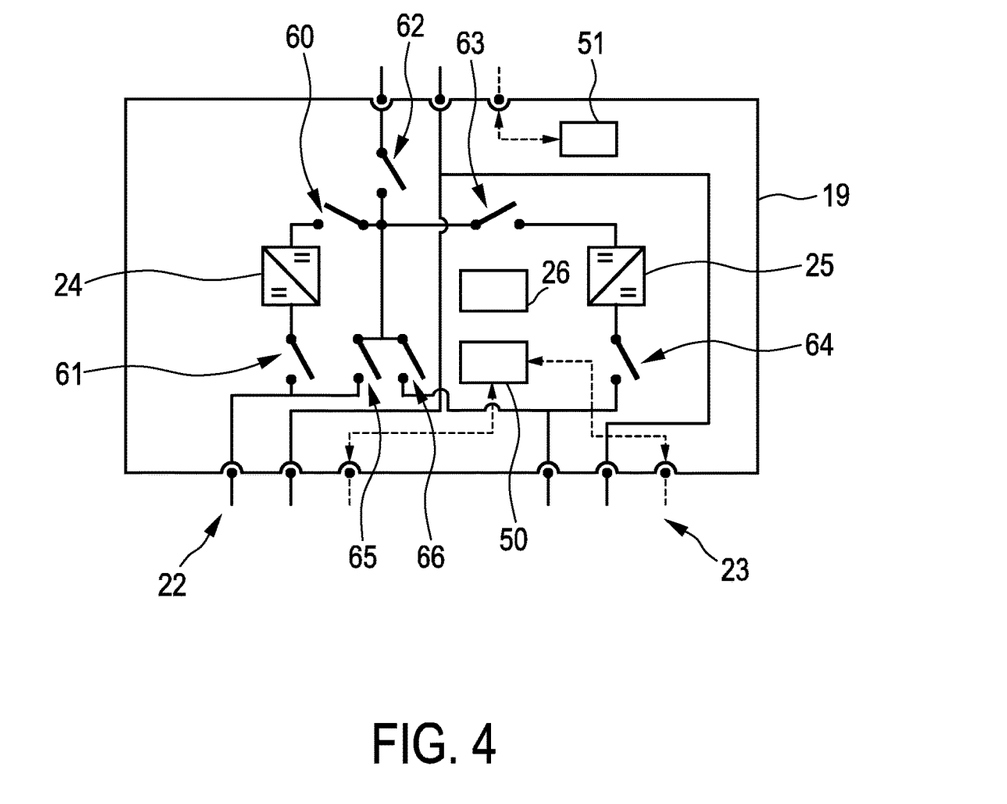
FIG. 4 shows schematically and exemplarily an embodiment of a power distribution device of the power distribution system.

Thus, the power distribution system provides a multi-socket distribution, i.e. a Y distribution, by using the power distribution device 19, wherein the power distribution device 19 includes converters and negotiates the input voltage with a respective socket 3, which is preferentially a wall socket, under consideration of the voltage required by the electrical loads 20, 21. The power distribution system 19 may further be adapted to allow a voltage feed-through for low losses, if the respective electrical load 20, 21 allows this. For providing this voltage feed-through the main switch 62 and bypass switches 65, 66 may be closed, i.e. may become conducting, whereas the switches 60, 63 may be opened, i.e. may become non-conducting.

Figure 5:
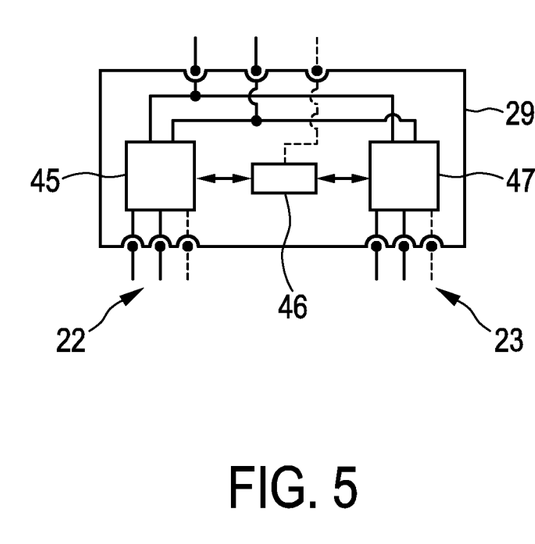
FIG. 5 shows schematically and exemplarily a further embodiment of a power distribution device of the power distribution system.

FIG. 5 schematically and exemplarily shows a further embodiment of a power distribution device for connecting several electrical loads 20, 21 to a same respective socket 3, which might be used instead of the power distribution device 19 described above with reference to FIG. 4.

The power distribution device 29 includes several connection sites 22, 23 to be connected with the several electrical loads 20, 21, DC power conversion units 45, 47 for converting the power from the respective socket 3 to converted power to be supplied to the respective electrical load 20, 21 and a power distribution device controller 46 for controlling the DC power conversion units 45, 47 and for negotiating power requirements with the socket controller 11 of the respective socket 3. The power distribution device controller 46 may be adapted to negotiate with the socket controller 11 of the respective socket 3 that the respective socket 3 should be operated in its bypass mode such that the power provided by the power supply 2 is also provided to the DC power conversion units 45, 47.

The DC power conversion units 45, 47 are preferentially adapted to negotiate the power to be supplied with the respective electrical load 20, 21 and to supply the respective negotiated power. For instance, the DC power conversion units 45, 47 can be similar to the sockets 3. In particular, the DC power conversion units 45, 47 may each comprise at least a) a socket communication unit for communicating with the respective electrical load 20, 21, especially for receiving a power request from the respective electrical load 20, 21, and optionally for communicating with the master device 9, b) a DC power converter for receiving the power supplied to the respective DC power conversion unit 45, 47 and for converting the received power to converted DC power to be supplied to the respective electrical load 20, 21 and c) a controller for controlling the respective DC power converter to provide the negotiated power, especially depending on a controlling signal received from the master device 9. The power distribution device controller 46 may also be adapted to request a lower power, especially a lower voltage, from the respective socket 3, wherein in this case the requested lower power is applied to the DC power conversion units 45, 47, which convert the power to the negotiated power to be supplied to the electrical loads 20, 21. The power distribution device controller 46 can be adapted to request the respective socket 3 to operate in its bypass mode for providing a higher power or in an operational mode, in which a lower power is provided, depending on the power negotiated by the respective DC power conversion unit 45, 47 with the respective electrical load 20, 21.

Generally, if a plug is removed from a socket, a dangerous spark may appear. The sockets 3 of the power distribution system 1 are preferentially adapted such that such sparks are avoided. For instance, the respective socket 3 can comprise a disconnection detection unit for detecting when a respective electrical device 4, 5, 6, 19 is disconnected from the respective socket 3, wherein the respective socket controller 11 can be adapted to shut down the supplied power, especially to open the main switch 18, after the disconnection detection unit has detected the disconnection. The respective socket controller 11 is preferentially adapted to shut down the supplied power in ms. For instance, the disconnection detection unit can comprise a lead pin which opens first during unplug. This pin may also be used for communication purposes, i.e. for communicating between the respective socket 3 and the respective electrical device 4, 5, 6, 19. In particular, the lead pin might be the pin 39, which is used for communication purposes and which connects the respective electrical device 4 with the communication unit 33 of the respective socket 3. The respective socket controller 11 may be adapted to switch off the respective socket 3, if this lead pin 39 gets disconnected. The communication unit 33 and the lead pin 39 can therefore be regarded as forming a disconnection detection unit for detecting when a respective electrical device 4 is disconnected from a respective socket 3.

Alternatively, the main switch 18 and the respective electrical device may be adapted such that during disconnecting the respective electrical device from the respective socket the respective socket is switched off before the electrical contacts get disconnected. Thus, a mechanical switch can be mounted in a way that it senses the population of the respective socket and that gets opened during extraction before the electrical contacts open. In this way the switch can be used for full deactivation for unused sockets and for electronic switch off, in order to protect for sparks during an unplug operation. Alternatively or in addition, optical means or additional contacts may be used as disconnection detection units for detecting an unplug operation, wherein, if the unplug operation has been detected, the respective socket may immediately be switched off. If the respective socket is adapted to firstly negotiate the power requirements during a plug-in action, wherein the voltage level is kept low on the contacts during the plug-in action, sparks do not occur. Thus, the power negotiation using low power on the contacts can also be regarded as being a spark and touch protection feature.

Figure 6:
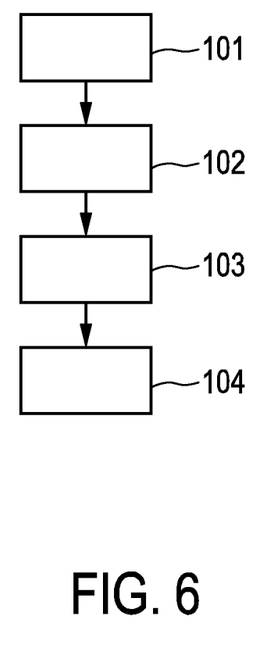
FIG. 6 shows a flowchart exemplarily illustrating an embodiment of a power distribution method for distributing power within the power distribution system.

In the following an embodiment of a power distribution method for supplying power from a power supply to several electrical loads within a power distribution system will exemplarily be described with reference to a flowchart shown in FIG. 6.

In step 101 the sockets of the power distribution system receive power requests from the electrical loads connected to the sockets. In step 102 the received power requests are transmitted to the master device of the power distribution system. In step 103 the socket power determination unit of the master device determines the power to be provided by the respective socket based on the received power requests and generates controlling signals for controlling the sockets depending on the determined powers. In particular, the master device can determine whether the requested overall power is not larger than the providable overall power and allow the sockets to provide the requested power, if the requested overall power is not larger than the providable overall power. In step 104 the DC power converters of the sockets are controlled depending on the respective controlling signal generated by the master device and the respective power request by the respective socket controller. For instance, if the controlling signal received from the master device indicates that the respective DC power converter is allowed to provide the respective requested power, the DC power converter is controlled to provide this power.

Known consumer devices, i.e. known electrical loads, have their own DC power supply, because the power is generally distributed as high voltage AC power in a supply installation. Furthermore, the consumer devices generally have their own demands for certain voltage and power levels. These individual power supplies put additional costs on the consumer devices and are generally not designed for long lifetimes due to cost reasons. The power distribution system described above with reference to FIG. 1 gets rid of the individual power supplies and allows consumer devices to be connected directly to the power distribution system, which may also be regarded as being a power supply installation, without additional power supply devices provided with the consumer devices. This can lead to a reduced weight and a reduced volume of electronic waste.

Several solutions are known for addressing the problem of individual power supplies. For instance, the IEEE organization proposes a UPAMD (Universal Power Adapter for Mobile Devices) standard, which describes a universal plug and which could also be used for a wall socket. The Power-over-Ethernet standard defines a central converter and sockets connected to the central converter in a star-like cable distribution, wherein each socket needs its own cable, which leads to long distances between the central converter and the electrical loads and corresponding cable losses. For this reason the power at each socket is limited. Furthermore, widely spread USB (Universal Serial Bus) sockets are also available as wall sockets delivering a fixed voltage. However, these solutions do not provide a variable voltage which adapts seamlessly to the needs of a connected device. They do also not describe a standby behavior and they do not provide a method for limiting or controlling the power flow on the supply side of the sockets. In contrast, the power distribution system described above with reference to FIG. 1 allows for a variable voltage, provides a standby behavior and allows for a limitation or controlling of the power flow on the supply side of the sockets.

The power distribution system preferentially comprises a high voltage distribution to limit distribution losses and the sockets are preferentially DC wall sockets, wherein the sockets include a power converter converting the high voltage distribution voltage to the voltage needed by the respective connected electrical load. The provided voltage is variable and can be set by a digital or analog feedback from the respective connected electrical load or by negotiation with the respective connected electrical load. The power distribution system can be used to distribute power within buildings. This may include professional as well as residential applications. The sockets are preferentially wall sockets. However, they can also be other kinds of sockets.

Although in above described embodiments the power transmission between the respective socket and the respective electrical load is a wired power transmission and the communication between the respective socket and the respective electrical load is a wired communication, in other embodiments the power transmission and/or the communication may be wireless. For instance, the respective electrical load may be wirelessly powered via the Qi standard or the Rezence standard. A socket could be, for instance, a wireless dock for a robotic vacuum cleaner being, in this example, the electrical load, wherein the robotic vacuum cleaner gets recharged when touching the respective spot on the wall, i.e. when being close enough to the respective socket for wirelessly sending a power request to the respective socket and for wirelessly receiving power from the respective socket. The socket may also be integrated in a table or in another piece of furniture for supporting an electrical load, which can wirelessly receive power from the respective socket. In particular, a socket can be integrated in a kitchen surface for supplying kitchen appliances.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

Operations like the generation of controlling signals, the power negotiation operations, the communication operations, et cetera performed by one or several units or devices can also be performed by any other number of units or devices. These operations and/or the control of the power distribution system in accordance with the power distribution method can be implemented as program code means of a computer program and/or as dedicated hardware.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention relates to a power distribution system for distributing power from a power supply to several electrical loads via sockets. The sockets receive power requests from the electrical loads and transmit the power requests to a master device which controls the power to be provided by the respective socket based on the received power requests. Since the master device receives all power requests from the sockets and has therefore an overview of the overall power requirements, the master device can determine the power to be provided by the respective socket under consideration of this knowledge. This can lead to an improved determination of the power to be provided by the respective socket and hence to an improved overall power distribution.

The invention claimed is:

1. A power distribution system for distributing power from a power supply to several electrical loads, the power distribution system comprising:
   a power supply for supplying power to several sockets, characterized by
   the several sockets for supplying converted DC power to the electrical loads, wherein each socket is adapted to receive a power request from an electrical load connected to the respective socket and wherein each socket comprises:
   i) a socket communication unit for transmitting the respective power request to a master device,
   ii) a DC power converter for receiving the supplied power and for converting the received power to converted DC power to be supplied to the respective electrical load,
   iii) a socket controller for controlling the DC power converter depending on a controlling signal received from the master device,
   the master device (9), wherein the master device comprises:
   i) a master communication unit for receiving the power requests from the sockets and for transmitting the controlling signals to the sockets,
   ii) a power capability providing unit for providing power capability information being indicative of the overall power providable by the power distribution system at the several sockets,
   iii) a socket power determination unit for determining the power to be provided by the respective socket based on the received power requests and based on the power capability information and for generating the controlling signals depending on the determined powers.

2. The power distribution system as defined in claim 1, wherein the socket power determination unit is adapted to determine the powers to be provided by the sockets consecutively, wherein it is determined that the respective socket is allowed to provide the respective requested power, as long as the overall power provided by the sockets does not exceed the overall power providable by the power distribution system, based on the received power requests and the provided power capability information.

3. The power distribution system as defined in claim 1, wherein the master device further comprises a priority providing unit for providing priority information being indicative of the priorities of the sockets, wherein the socket power determination unit is adapted to determine the power to be provided by the respective socket based on the power requests received from the sockets, the provided power capability information and the provided priority information.

4. The power distribution system as defined in claim 1, wherein the respective socket comprises a bypass channel for bypassing the DC power converter such that the power supplied to the electrical load connected to the respective socket is not converted by the DC power converter.

5. The power distribution system as defined in claim 1, wherein the respective DC power converter is a higher DC power converter being capable of providing a higher DC power, wherein the respective socket further comprises a lower DC power converter for converting the supplied DC power to a lower DC power, wherein the respective socket controller is adapted to control whether the lower DC power converter is used for converting the supplied power.

6. The power distribution system as defined in claim 1, wherein the respective socket further comprises a disconnection detection unit for detecting when a respective electrical load is disconnected from a respective socket, wherein the respective socket controller is adapted to shut down the supplied power, after the disconnection detection unit has detected the disconnection.

7. The power distribution system as defined in claim 1, wherein the respective socket comprises a main switch for switching the respective socket on and off, wherein the main switch and a respective electrical load are adapted such that the respective socket is switched on by the electrical load, if the respective electrical load is connected to the respective socket.

8. The power distribution system as defined in claim 7, wherein the main switch and the respective electrical load are adapted such that during disconnecting the respective electrical load from the respective socket the respective socket is switched off before electrical contacts between the electrical load and the respective socket get disconnected.

9. The power distribution system as defined in claim 1, wherein the respective socket is adapted to be operable in an operational mode and in a safety mode and comprises a failure detection unit for detection a failure condition, wherein the respective socket controller is adapted to control the socket to be in the safety mode, if the failure detection unit has detected a failure condition.

10. The power distribution system as defined in claim 1, wherein the power distribution system further comprises a power distribution device for connecting several electrical loads to a same socket, wherein the power distribution device includes:
several connection sites to be connected with the several electrical loads,
a DC power converter for converting the power from the socket to converted power to be supplied to the respective electrical load,
a power distribution device controller for controlling the DC power converter and for negotiating power requirements with the socket controller of the respective socket.

11. The power distribution system as defined in claim 1, wherein the DC power converters are adapted to operate bidirectionally, in order to allow a DC power providing unit to be connected to a socket such that DC power provided by the DC power providing unit is distributable within the power distribution system.

12. A master device for being used within a power distribution system as defined in claim 1, wherein the master device comprises:
a master communication unit for receiving power requests from the sockets of the power distribution system and for transmitting controlling signals to the sockets,
a power capability providing unit for providing power capability information being indicative of the overall power providable by the power distribution system at the several sockets,
a socket power determination unit for determining the power to be provided by the respective socket based on the received power requests and based on the power capability information and for generating the controlling signals depending on the determined powers.

13. A power distribution method for distributing power from a power supply to several electrical loads within a power distribution system as defined by claim 1, the power distribution method comprising:
supplying power to several sockets by the power supply,
receiving power requests from the electrical loads connected to the sockets of the power distribution system by the sockets,
transmitting the received power requests to the master device of the power distribution system by the sockets,
providing power capability information being indicative of the overall power providable by the power distribution system at the several sockets by a power capability providing unit of the master device,
determining the power to be provided by the respective socket based on the received power requests and based on the power capability information and generating controlling signals for controlling the sockets depending on the determined powers by the socket power determination unit of the master device,
transmitting the controlling signals to the sockets by the master communication unit of the master device,
controlling the DC power converters of the sockets depending on the respective controlling signal received from the master device by the respective socket controllers.

14. A computer program for controlling a power distribution system as defined in claim 1, the computer program comprising program code means for causing the power distribution system to carry out the steps of the power distribution method.

* * * * *